(12) United States Patent
Bohling et al.

(10) Patent No.: US 7,842,768 B2
(45) Date of Patent: Nov. 30, 2010

(54) PROCESS FOR MACROPOROUS ACRYLIC RESINS

(75) Inventors: James Charles Bohling, Lansdale, PA (US); Roy Jeffrey Furbank, Lansdale, PA (US); Bruce Maurice Rosenbaum, Fort Washington, PA (US)

(73) Assignee: Rohm and Haas Company, Philadelphia, PA (US)

( * ) Notice: Subject to any disclaimer, the term of this patent is extended or adjusted under 35 U.S.C. 154(b) by 406 days.

(21) Appl. No.: 11/974,065

(22) Filed: Oct. 11, 2007

(65) Prior Publication Data

US 2008/0032133 A1    Feb. 7, 2008

Related U.S. Application Data

(62) Division of application No. 11/449,427, filed on Jun. 8, 2006, now Pat. No. 7,323,527.

(51) Int. Cl.
    *C08F 118/02* (2006.01)
(52) U.S. Cl. .................. 526/319; 526/318; 526/328; 526/329.7; 526/336
(58) Field of Classification Search .............. 526/318, 526/319, 328, 329.7, 336
    See application file for complete search history.

(56) References Cited

U.S. PATENT DOCUMENTS

| | | | |
|---|---|---|---|
| 3,418,262 A | 12/1968 | Werotte et al. | |
| 3,509,078 A | 4/1970 | Roubinek et al. | |
| 3,767,600 A | 10/1973 | Albright et al. | |
| 3,892,822 A | 7/1975 | Frechtling | |
| 4,129,534 A | 12/1978 | Cunningham | |
| 4,486,313 A | 12/1984 | Meitzner et al. | |
| 4,614,751 A | 9/1986 | Chonde | |
| 4,948,818 A | 8/1990 | Carmody et al. | |
| 5,169,904 A | 12/1992 | Ziemelis et al. | |
| 5,175,193 A | 12/1992 | Heller et al. | |
| 5,210,159 A | 5/1993 | Aoyama et al. | |
| 5,216,044 A | 6/1993 | Hoshino et al. | |
| 5,393,845 A | 2/1995 | Korte et al. | |
| 5,856,409 A | 1/1999 | Ziemelis et al. | |
| 6,080,797 A * | 6/2000 | Nishida | 521/64 |

OTHER PUBLICATIONS

Guo, et al., "Macroporous Poly(calcium acrylate-divinylbenzene) Bead a Selective Ortho . . . " Industrial & Engineering Chemist Research, vol. 42, No. 22, pp. 5559-5567 (2003).

Okay, "Macroporous Copolymer Networks", Progress in Polymer Science, Coden: PRPSB8; ISSN: 0079-6700, vol. 25, No. 6, pp. 711-779 (2000).

* cited by examiner

*Primary Examiner*—Ling-Siu Choi
(74) *Attorney, Agent, or Firm*—Kenneth Crimaldi

(57) ABSTRACT

A macroporous core-shell resin bead having carboxylic acid groups; the bead has from 3% to 100% of monomer residues derived from crosslinker, an average pore diameter of at least 1.5 nm, and an average particle size from 10 μm to 900 μm; wherein at least 90% of the carboxylic acid groups in the bead are in the shell region, and the shell region comprises from 5% to 75% of the bead by volume.

7 Claims, No Drawings

PROCESS FOR MACROPOROUS ACRYLIC RESINS

This patent application is a divisional application of patent application Ser. No. 11/449,427, filed Jun. 8, 2006 now U.S. Pat. No. 7,323,527.

The present invention relates to an improved method for producing macroporous acrylic resins.

Typically, macroporous acrylic resins are produced in an aqueous suspension with aid of a porogen (an organic solvent) which must be removed at the end of the polymerization. For example, U.S. Pat. No. 4,486,313 discloses a process for making macroporous resins. Production of resins having carboxylic acid substituents requires an additional step because (meth)acrylic acid is substantially water soluble. It is preferable to polymerize a water-insoluble precursor to (meth)acrylic acid, e.g., alkyl (meth)acrylates, then to hydrolyze the alkyl esters on the resin to carboxylic acid groups. In a typical process the resin copolymer is produced by polymerizing a monoethylenically unsaturated monomer, a multiethylenically unsaturated monomer (crosslinker) and porogen. The porogen is then removed by distillation or optionally by solvent washing. The product is then often washed and transferred to another vessel for hydrolysis.

The problem addressed by this invention is the inefficiency of the typical process used to make macroporous acrylic resins.

STATEMENT OF THE INVENTION

The present invention is directed to a method for producing a macroporous acrylic resin. The method comprises steps of: (a) combining: (i) water; (ii) a $C_1$-$C_4$ alkyl acrylate; (iii) a crosslinker; (iv) an organic solvent; and (v) a polymerization initiator; to form a reaction mixture; (b) forming a stable dispersion of organic droplets, and allowing said droplets to react to form a resin; (c) adding an acid or a base without removing more than 50% of said organic solvent; and (d) heating to hydrolyze ester groups on the resin.

The present invention is further directed to a method for producing a macroporous acrylic resin. The method comprises steps of: (a) combining: (i) water; (ii) at least one monoethylenically unsaturated monomer selected from among $C_1$-$C_4$ alkyl acrylates, acrylonitrile and methacrylic acid; (iii) a crosslinker; and (iv) a polymerization initiator; to form a reaction mixture; (b) forming a stable dispersion of organic droplets, and allowing said droplets to react to form a resin; (c) adding an acid or a base without removing more than 50% of said aqueous solution; and (d) heating to hydrolyze ester or nitrile groups on the resin.

The present invention is further directed to a method for producing a macroporous core-shell acrylic resin bead. The method comprises steps of (a) combining in an aqueous solution a $C_1$-$C_4$ alkyl acrylate, a crosslinker, a hydrophobic solvent and a polymerization initiator; (b) agitating to form a stable dispersion of organic droplets, and allowing said droplets to react to form a resin; (c) adding an acid or a base without removing more than 50% of said aqueous solution; and (d) heating to hydrolyze ester groups on the resin.

The present invention is further directed to a macroporous core-shell resin bead having carboxylic acid groups. The bead comprises a core region surrounded by a shell region. The bead has from 3% to 100% of monomer residues derived from crosslinker, an average pore diameter of at least 1.5 nm, and an average particle size from 10 μm to 900 μm; wherein at least 90% of the carboxylic acid groups in the bead are in the shell region, and the shell region comprises from 5% to 75% of the bead by volume.

DETAILED DESCRIPTION OF THE INVENTION

All percentages and ppm values are by weight, and are on the basis of total weight of the composition, and all temperatures are in ° C., unless otherwise indicated. The terms "(meth)acrylic" and "(meth)acrylate" refer to acrylic or methacrylic, and acrylate or methacrylate, respectively. The term "acrylic polymers" refers to polymers comprising at least 50% monomer units derived from among acrylonitrile (AN); acrylamide (AM) and its N-substituted derivatives; acrylic acid (AA), methacrylic acid (MAA), and their esters; and itaconic acid (IA). Esters of AA and MAA include, but are not limited to, methyl methacrylate (MMA), ethyl methacrylate (EMA), butyl methacrylate (BMA), ethylhexyl methacrylate (EHMA), lauryl methacrylate (LMA), hydroxyethyl methacrylate (HEMA), methyl acrylate (MA), ethyl acrylate (EA), butyl acrylate (BA), ethylhexyl acrylate (EHA) and hydroxyethyl acrylate (HEA), as well as other esters of AA or MAA, e.g., alkyl, hydroxyalkyl and aminoalkyl esters. Derivatives of acrylamide include, e.g., methylol acrylamide (MLAM). Acrylic polymers also may contain monomer units derived from other monoethylenically unsaturated monomers, e.g., styrene or substituted styrenes; other α,β-unsaturated carboxylic acids, esters and amides; vinyl esters or halides; etc. Preferably, an acrylic polymer contains less than 30% of these other monomer units, more preferably less than 10%, and most preferably the acrylic polymers are substantially free of monomer units other than those of AA, MAA, their esters and a crosslinker, preferably DVB.

The acrylic resin of this invention comprises residues derived from at least one monoethylenically unsaturated monomer selected from among $C_1$-$C_4$ alkyl acrylates, acrylonitrile and methacrylic acid. Preferably, $C_1$-$C_4$ alkyl acrylates are $C_1$-$C_2$ alkyl acrylates. The resin further comprises residues derived from a crosslinker. Preferably, the resin is produced from a mixture of monoethylenically unsaturated monomers and crosslinkers that is at least 70% monoethylenically unsaturated monomer, more preferably at least 80% and most preferably at least 85%, based on the total weight of monoethylenically unsaturated monomers and crosslinkers. Preferably, the mixture of monoethylenically unsaturated monomers and crosslinkers has no more than 97% monoethylenically unsaturated monomer, more preferably no more than 95%, more preferably no more than 94% and most preferably no more than 92%, based on the total weight of monoethylenically unsaturated monomers and crosslinkers. Preferred crosslinkers include, e.g., divinylbenzene (DVB), trivinylcyclohexane (TVCH), divinyltoluene, di- and tri-allyl maleate, triallyl phosphate, allyl methacrylate, diallyl itaconate, ethylene glycol divinyl ether (EGDMA), triethylene glycol dimethacrylate, tetraethylene glycol dimethacrylate, ditrimethylolpropane dimethacrylate; 1,3-butylene glycol dimethacrylate, 1,4-butanediol dimethacrylate, 1,6-hexanediol dimethacrylate, neopentyl glycol dimethacrylate, pentaerythritol and dipentaerythritol dimethacrylate, bisphenol A dimethacrylate, dimethacrylates of propylene, dipropylene and higher propylene glycols; trimethylolpropane ethoxylated tri(meth)acrylate, trimethylolpropane tri(meth)acrylate (TMPT(M)A) and diethylene glycol divinyl ether (DEGDVE). The most preferred crosslinkers are DVB, DEGDVE and TMPTMA. Preferably, the resin is produced from a mixture of monoethylenically unsaturated monomers and crosslinkers that is from 3% to 100% crosslinker(s), based on the total weight of monomers and crosslinkers. More preferably the amount of crosslinker(s) is at least 5%, more preferably at least 6%, and most preferably at least 8%. In one preferred embodiment, the amount of crosslinker(s) is no more than 30%, more preferably no more than 20%, and most preferably no more than 15%. The resin of this invention may include residues of more than one monoethylenically unsaturated monomer and/or more than one crosslinker.

In one embodiment of the invention, the resin is a highly crosslinked material made from a mixture of monoethylenically unsaturated monomers and crosslinkers that is at least 80% crosslinker(s), based on the total weight of monomers and crosslinkers. A highly crosslinked resin, even one that is made from 100% crosslinker, and no monoethylenically unsaturated monomer, can be hydrolyzed in the presence of a porogen to produce a resin having carboxylic acid functionality, provided that the crosslinker is one having ester functionality, e.g., a di- or tri-(meth)acrylate. In such a case, the polymer will be degraded slightly where the ester groups have been hydrolyzed to produce carboxylic acid functionality.

Macroporous resins are those having a surface area from 5 $m^2/g$ to 2000 $m^2/g$, and an average pore diameter of at least 1.5 nm. Preferably, macroporous resin beads have an average particle size from 10 μm to 900 μm, more preferably from 100 μm to 500 μm. Macroporous resin beads are not comprised of aggregates of clusters of smaller particles, but are substantially spherical in shape. Preferably, particle size is measured in the unswollen condition, i.e., before any neutralization to raise the pH to 6 or higher. The macroporous acrylic resin beads in the present invention preferably are produced by a suspension polymerization. A typical bead preparation, for example, may include preparation of a continuous aqueous phase solution containing typical suspension aids, for example, dispersants, protective colloids and buffers. Preferably, to aid in production of relatively small beads, a surfactant is included in the aqueous solution, preferably a sodium alkyl sulfate surfactant. A stable dispersion of the organic phase, i.e., the monomer(s), crosslinker, organic solvent if present, can be produced by several known methods, including jetting (see U.S. Pat. No. 4,444,961), seed expansion technology (see U.S. Pub. No. 2003/0109657), and vigorous agitation of the two-phase mixture. After the dispersion is formed, agitation is maintained during the polymerization process. The aqueous solution is combined with a mixture containing at least one monoethylenically unsaturated monomer and/or at least one crosslinker, and at least one free-radical initiator. Preferably, the total initiator level is from 0.25 mole percent to 2 mole %, based on the total monomer charge, preferably from 0.4 mole percent to 1.5 mole percent, more preferably from 0.4 mole percent to 1 mole percent, and most preferably from 0.5 mole percent to 0.8 mole percent. The mixture of monomers is then polymerized at elevated temperature. Preferably, the polymerization is continued for a time sufficient to reduce the unreacted vinyl monomer content to less than 1% of the starting amount.

Polymerization initiators useful in the present invention include monomer-soluble initiators such as peroxides, hydroperoxides, peroxyesters and related initiators; for example benzoyl peroxide (BPO), tert-butyl hydroperoxide, cumene peroxide, tetralin peroxide, acetyl peroxide, caproyl peroxide, tert-butyl peroctoate (also known as tert-butylperoxy-2-ethylhexanoate), tert amyl peroctoate, tert-butyl perbenzoate, tert-butyl diperphthalate, dicyclohexyl peroxydicarbonate, di(4-tert-butylcyclohexyl)peroxydicarbonate, methyl ethyl ketone peroxide and methylated polyethyleneimine. Also useful are azo initiators such as azodiisobutyronitrile, azodi-isobutyramide, 2,2' azo-bis(2,4-dimethylvaleronitrile), azo-bis(α-methyl-butyronitrile) and dimethyl-, diethyl- or dibutyl azo-bis(methylvalerate). Preferred peroxide initiators are diacyl peroxides, such as benzoyl peroxide, and peroxyesters, such as tert-butyl peroctoate and tert-butyl perbenzoate.

Dispersants and suspending agents useful in the present invention include nonionic surfactants having a hydroxyalkylcellulose backbone, a hydrophobic alkyl side chain containing from 1 to 24 carbon atoms, and an average of from 1 to 8, preferably from 1 to 5, ethylene oxide groups substituting each repeating unit of the hydroxyalkyl-cellulose backbone, the alkyl side chains being present at a level of 0.1 to 10 alkyl groups per 100 repeating units in the hydroxyalkylcellulose backbone. The alkyl group in the hydroxyalkylcellulose may contain from 1 to 24 carbons, and may be linear, branched or cyclic. More preferred is a hydroxyethylcellulose containing from 0.1 to 10 ($C_{16}$)alkyl side chains per 100 anhydroglucose units and from about 2.5 to 4 ethylene oxide groups substituting each anhydroglucose unit. Other examples of dispersants include polyvinyl alcohol, methyl cellulose, starch, modified starch, hydrolyzed ethylene-maleic anhydride polymers, hydrolyzed styrene-maleic anhydride polymers, acrylamide-sodium acrylate polymers, and polyvinylimidazoline polymers. Typical use levels of dispersants are from about 0.01 to about 4%, based upon the total aqueous-phase weight.

The organic solvent which is present in one embodiment of the method of this invention has a boiling point of at least 70° C.; in one embodiment of the invention, the boiling point is no higher than 180° C. Preferably, the organic solvent is a good solvent for the monomers, but not for the polymer. Preferably, it is not an ethylenically unsaturated monomer, e.g., a (meth)acrylate, a (meth)acrylic acid, a (meth)acrylamide, a styrene monomer, or a vinyl alkanoate. Preferably, the organic solvent is not a carboxylic acid, a water-soluble solvent (i.e., one having water solubility >10% by weight), or one which could interfere with polymerization, e.g., an alkyl thiol. Preferably the organic solvent is selected from among $C_7$-$C_{10}$ hydrocarbons, $C_3$-$C_{10}$ halogenated hydrocarbons, $C_4$-$C_{10}$ ketones, $C_4$-$C_{10}$ alcohols, $C_4$-$C_{10}$ alkyl esters, $C_4$-$C_{10}$ aryl esters, $C_4$-$C_{10}$ mixed alkyl/aryl esters, and combinations thereof. Especially preferred solvents include methyl isobutyl ketone (MIBK), diisobutyl ketone (DIBK), methyl isobutyl carbinol (MIBC), 1,2-dichloropropane, toluene (tol), xylenes, isooctane, chlorobenzene and n-butyl acetate. Methods for producing resin beads in the presence of solvents are disclosed, e.g., in U.S. Pat. No. 4,486,313. An organic solvent present during the polymerization process is also referred to as a porogen. The amount of solvent added, as a percentage of the monoethylenically unsaturated monomers, crosslinkers and solvent, preferably is from 30% to 80%, more preferably from 35% to 60%.

In one embodiment of the invention in which at least one monomer is selected from among acrylonitrile and methacrylic acid, a macroporous resin can be produced without addition of an organic solvent to serve as a porogen. In this embodiment, acrylonitrile or methacrylic acid acts as a porogen. In another embodiment in which at least one monomer is selected from among $C_1$-$C_4$ alkyl acrylates, preferably an organic solvent is present in the reaction mixture.

An acid or base used in the method of this invention is any acid or base that is water-soluble (at least 20% by weight) and capable of hydrolyzing carboxylic esters under the conditions stated herein. Preferably, bases have a $pK_a$ of at least 12, and acids have a $pK_a$ no greater than 2. Preferred bases are inorganic hydroxides. An inorganic hydroxide base can be any readily water-soluble hydroxide-containing compound, preferably an alkali metal hydroxide or a quaternary ammonium hydroxide, and most preferably sodium or potassium hydroxide. Preferred acids are sulfuric acid and hydrochloric acid.

It has been found that, unexpectedly, one can perform the hydrolysis after the polymerization is complete in the polymerization liquor (aqueous solution) itself, without separating the resin beads from the aqueous liquor or from the organic solvent, if one was used. Preferably, most of the liquor still is present during the hydrolysis. In some instances it may be desirable to drain some of the liquor. In one embodiment of the invention, at least 50% of the aqueous solution is present during hydrolysis, more preferably at least 75%, more preferably at least 90%, and most preferably substantially all of the aqueous solution remains. In one embodiment of the invention, some of the porogen and some of the water of the dispersing phase are removed by distillation, followed by addition of caustic and heating for some period of time at elevated temperatures. This improved process saves cycle time and resources as there is no washing or draining between polymerization and hydrolysis. The water from the polymerization aqueous phase is conserved and combined with acid or base to form the hydrolysis liquor in the polymerization vessel in the presence of the resin beads. Another advantage is that by diluting the acid or base in the vessel, heat is generated which reduces energy usage required to reach the hydrolysis reaction temperature and for the distillation of porogen if required. There is also less attrition on the beads and less chance for cross contamination with the reduced handling.

In one embodiment of the invention, the hydrolysis is performed concurrently with distillation of the porogen as one step. In this process, at the end of the polymerization base (or acid) is added to the reaction mixture containing the porogen-laden polymer beads and heated to distillation temperature. The porogen is distilled without removing the bulk of the aqueous solution. Preferably, at least 50% of the aqueous solution remains in the reactor during distillation, more preferably at least 75%, more preferably at least 90%, and most preferably substantially all of the aqueous solution remains. In some instances, a multi-phase system is visible as the process progresses and the resin becomes converted because the porogen is expelled during the hydrolysis. Optionally at this point, when the separate porogen phase is noted (typically at the top of the reaction medium) and the resin has become more dense than the hydrolysis media, the resin may be washed in upflow mode to remove the porogen and avoid the bulk of the distillation.

In one embodiment of the invention, at least 50% of the porogen remains at the beginning of the hydrolysis. Preferably, at least 75% of the porogen remains, more preferably at least 90%. In this embodiment, the aqueous phase optionally remains during distillation, as described above, or the aqueous phase is removed, but without removing porogen, which appears as a separate phase.

Preferred conditions for hydrolysis are a temperature in the range from 80° C. to 110° C., more preferably from 85° C. to 105° C. Hydrolysis time should be sufficient for conversion of at least 99% of the ester groups to carboxylic acid groups. Typical times are from 3 hours to 15 hours, preferably from 5 hours to 10 hours. When porogen is being distilled concurrently with hydrolysis, times may be longer to allow more complete removal of porogen.

In one embodiment of the invention, distillation of porogen is continued until at least 80% of the porogen has been removed from the reaction mixture, most preferably until at least 95% of the porogen has been removed. Times and temperatures vary considerably depending on the pressure at which distillation occurs. Typically, the temperature increases steadily during distillation as lower-boiling azeotropes distill from the mixture. Preferred conditions for distillation of porogen prior to hydrolysis are a temperature in the range from 50° C. to 130° C., more preferably from 60° C. to 110° C. Typical times are from 3 hours to 15 hours, preferably from 5 hours to 10 hours. Of course, if porogen separates from the aqueous phase and is removed mechanically, as described above, the distillation times would be shorter.

In one embodiment of the invention, a hydrophobic organic solvent is used as a porogen, and said hydrophobic solvent slows hydrolysis of ester or nitrile groups in the resin bead. In this embodiment, only the ester or nitrile groups near the outside of the resin bead are hydrolyzed. Hydrophobic solvents are those organic solvents defined herein as suitable porogens, with the exception of alcohols, amines and esters. Examples of hydrophobic solvents include, e.g., $C_7$-$C_{10}$ hydrocarbons, $C_3$-$C_{10}$ halogenated hydrocarbons, $C_4$-$C_{10}$ ketones, and combinations thereof. Preferred hydrophobic solvents include, e.g., toluene, 1,2-dichloropropane, xylene and isooctane. This produces a macroporous resin bead having a "core-shell" structure, i.e., one in which the polymer at the center of the bead differs significantly in composition from the polymer at the surface of the bead. In core-shell beads, the core is a roughly spherical region surrounded by a shell. In this particular case, the polymer at or near the surface of the bead has carboxylic acid groups, while the polymer at or near the center is substantially free of carboxylic acid groups, i.e., it has less than 1% carboxylic acid groups by weight. The polymer at or near the center of the bead has nitrile or ester groups. Preferably, at least 90% of the carboxylic acid groups in the bead are in the shell region, more preferably at least 95%, and most preferably at least 99%. Preferably, the shell region comprises no more than 50% of the bead by volume, more preferably no more than 30%. Preferably, the shell region comprises at least 5% of the bead by volume, more preferably at least 10%. The size of the shell region can be controlled through selection of the porogen and by varying the hydrolysis conditions. The size of the shell can be increased by use of more rigorous hydrolysis conditions, and also by use of a less hydrophobic solvent as a porogen.

EXAMPLES

Polymerizations were conducted using the following systems:

|   | Monomer | DVB % | Porogen (%) | Dispersant | Initiator | Temp (° C.) |
|---|---------|-------|-------------|------------|-----------|-------------|
| 1 | MA | 12 | TOL (45) | MHEC[1] | 1% BPO | 70 |
| 2 | MA | 12 | MIBK (45) | MHEC | 1% BPO | 70 |
| 3 | MA | 10 | MIBK (45) | PADMAC/Pharmagel[2] | 1% BPO | 70 |
| 4 | MA | 12 | MIBC (45) | MHEC | 1% BPO | 70 |
| 5 | MA | 12 | DIBK (45) | MHEC | 1% BPO | 70 |

-continued

| Monomer | DVB % | Porogen (%) | Dispersant | Initiator | Temp (° C.) |
|---------|-------|-------------|------------|-----------|-------------|

[1]Methyl hydroxyethyl cellulose
[2]PADMAC is a polyquaternary ammonium salt; Pharmagel is a gelatin material.

Four schemes for performing the hydrolysis and strip of the resulting copolymer were used, as follows:

| A | Standard/traditional procedure | Polymerize→strip→wash→hydrolyze→wash |
|---|---|---|
| B | No washing after polymerization | Polymerize→strip→hydrolyze→wash |
| C | Low temperature hydro-strip | Polymerize→strip/hydrolyze→wash |
| D | High temperature hydro-strip | Polymerize→strip/hydrolyze→wash |

Example 1

Standard Procedure with Washing

A mixture of 178.1 g methyl acrylate, 41.9 g divinylbenzene (63% active ingredient), 180.0 g toluene, and 2.82 g benzoyl peroxide (78% active ingredient) was charged to a 2 L round bottom flask containing an aqueous solution of 0.60 g methyl hydroxyethyl cellulose, 3.60 g boric acid, 1.8 g of 50% sodium hydroxide, and 594.0 g deionized water. The aqueous solution was adjusted to a pH of 9 with small amounts of additional boric acid and sodium hydroxide. The mixture was agitated until a stable dispersion of organic droplets had formed in the aqueous phase and then the mixture was heated to 70° C. for 8 hours.

The resulting copolymer beads and reaction mixture was then split in half and each half was distilled at temperatures ranging from 90-100° C. to remove the toluene porogen from the beads. The distillation was performed until no further toluene was evident in the distillate receiver. The resulting toluene recoveries were 91% and 92% for the two halves of the batch.

The first half of the batch was then removed from the reactor and transferred to a Buchner funnel where the remaining liquid reaction mixture was drained and the beads subsequently washed with four bed volumes of water. The beads were then returned to the reactor with 491 g of water. The mixture was agitated and 327.4 g of 50% sodium hydroxide was added. The resulting mixture was then heated to 93° C. for seven hours during which time the resin beads were hydrolyzed to the sodium salt form of the carboxylic acid. The resin was then washed with water and converted to the hydrogen form using 10% sulfuric acid. The percent volume change (decrease) of the resin from the sodium form to the hydrogen form was 54%. The resulting moisture holding capacity (MHC) of this resin was 57.9% and the weight and volume capacities were 9.78 eq/L and 2.94 eq/L, respectively.

Example 2

Standard Procedure without Washing

The second half of the batch from Example 1 was returned to the reactor without the water washing step and the caustic hydrolysis performed as in that example. Subsequent to the hydrolysis the resin was washed and converted to the hydrogen form using 10% sulfuric acid. The percent volume change (decrease) of the resin from the sodium form to the hydrogen form was 55%. The resulting moisture holding capacity (MHC) of this resin was 59.9% and the weight and volume capacities were 10.08 eq/L and 2.90 eq/L, respectively.

Example 3

Low Temperature Hydrostrip

A mixture of 178.1 g methyl acrylate, 41.9 g divinylbenzene (63% active ingredient), 180.0 g toluene, and 2.82 g benzoyl peroxide (78% active ingredient) was charged to a 2 L round bottom flask containing an aqueous solution of 0.60 g methyl hydroxyethyl cellulose, 3.60 g boric acid, 1.8 g of 50% sodium hydroxide, and 594.0 g deionized water. The aqueous solution was adjusted to a pH of 9 with small amounts of additional boric acid and sodium hydroxide. The mixture was agitated until a stable dispersion of organic droplets had formed in the aqueous phase and then the mixture was heated to 70° C. for 8 hours. The resulting copolymer beads and reaction mixture was then split in half.

The first half of the batch was then immediately hydrolyzed with 327.4 g of 50% sodium hydroxide without first removing the porogen from the resin in a distillation step. The reaction mixture was heated to 93° C. and held for seven hours. During the hydrolysis a small amount of a two-phase liquid mixture collected in the distillate trap. The liquid phases were separated using a separatory funnel and consisted of 6.7 g toluene (corresponds to 7% recovery) and 1.7 g of an aqueous layer. The resulting beads were observed using an optical microscope and it was found that the beads had a core-shell appearance. The shell was approximately 10 μm thick and was due to only the outer region of the beads being hydrolyzed. The core of the beads were not hydrolyzed and still contained toluene.

This mixture was then transferred to a Buchner funnel and the liquid drained. The drained liquid consisted of a single aqueous phase and no toluene was recovered from the reaction mixture. The resin was then washed with water and returned to the reactor and distilled. During this distillation an additional 61.4 g of toluene was recovered (corresponding to a total toluene recovery of 76%).

The resin was then washed with water and converted to the hydrogen form using 10% sulfuric acid. The percent volume change (decrease) of the resin from the sodium form to the hydrogen form was 20%. The resulting moisture holding capacity (MHC) of this resin was 60.1% and the weight and volume capacities were 5.14 eq/L and 1.51 eq/L, respectively.

Example 4

High Temperature Hydrostrip

The second half of the batch from Example 3 was returned to the reactor and the caustic hydrolysis performed as in that example although at more elevated temperature. After initially reaching 93° C. the temperature was increased to drive the distillation of porogen concurrently with the hydrolysis. Over the seven hours of the experiment the maximum temperature achieved was 105° C. The distillate composition after the combined hydrolysis-distillation was 20.0 g toluene (22% recovery) and 28.2 g aqueous. These beads also had the core-shell appearance described in Example 3 although in this case the shell was larger (approximately 25 μm). This mixture was then transferred to a Buchner funnel and the liquid drained. The drained liquid consisted of a single aqueous phase and no toluene was recovered from the reaction mixture. The resin was then washed with water and returned to the reactor and distilled. During this distillation an additional 52.0 g of toluene was recovered (total toluene recovery of 80%).

The resin was washed and converted to the hydrogen form using 10% sulfuric acid. The percent volume change (decrease) of the resin from the sodium form to the hydrogen form was 32%. The resulting moisture holding capacity (MHC) of this resin was 61.9% and the weight and volume capacities were 6.62 eq/L and 1.85 eq/L, respectively.

Example 5

Standard Procedure with Washing

A mixture of 178.1 g methyl acrylate, 41.9 g divinylbenzene (63% active ingredient), 180.0 g methyl isobutyl ketone (MIBK), and 2.82 g benzoyl peroxide (78% active ingredient) was charged to a 2 L round bottom flask containing an aqueous solution of 0.60 g methyl hydroxyethyl cellulose, 3.60 g boric acid, 1.8 g of 50% sodium hydroxide, and 594.0 g deionized water. The aqueous solution was adjusted to a pH of 9 with small amounts of additional boric acid and sodium hydroxide. The mixture was agitated until a stable dispersion of organic droplets had formed in the aqueous phase and then the mixture was heated to 70° C. for 8 hours.

The resulting copolymer beads and reaction mixture was then split in half and each half was distilled at temperatures ranging from 90-100° C. to remove the MIBK porogen from the beads. The distillation was performed until no further MIBK was evident in the distillate receiver. The resulting MIBK recoveries were 93% and 90% for the two halves of the batch.

The first half of the batch was then removed from the reactor and transferred to a Buchner funnel where the remaining liquid reaction mixture was drained and the beads subsequently washed with four bed volumes of water. The beads were then returned to the reactor with 491 g of water. The mixture was agitated and 327.4 g of 50% sodium hydroxide was added. The resulting mixture was then heated to 93° C. for seven hours during which time the resin beads were hydrolyzed to the sodium salt form of the carboxylic acid. The resin was then washed with water and converted to the hydrogen form using 10% sulfuric acid. The percent volume change (decrease) of the resin from the sodium form to the hydrogen form was 57%. The resulting moisture holding capacity (MHC) of this resin was 64.3% and the weight and volume capacities were 9.36 eq/L and 2.46 eq/L, respectively.

Example 6

Standard Procedure without Washing

The second half of the batch from Example 5 was returned to the reactor without the water washing step and the caustic hydrolysis performed as in that example. Subsequent to the hydrolysis the resin was washed and converted to the hydrogen form using 10% sulfuric acid. The percent volume change (decrease) of the resin from the sodium form to the hydrogen form was 54%. The resulting moisture holding capacity (MHC) of this resin was 63.5% and the weight and volume capacities were 9.62 eq/L and 2.58 eq/L, respectively.

Example 7

Low Temperature Hydrostrip

A mixture of 178.1 g methyl acrylate, 41.9 g divinylbenzene (63% active ingredient), 180.0 g MIBK, and 2.82 g benzoyl peroxide (78% active ingredient) was charged to a 2 L round bottom flask containing an aqueous solution of 0.60 g methyl hydroxyethyl cellulose, 3.60 g boric acid, 1.8 g of 50% sodium hydroxide, and 594.0 g deionized water. The aqueous solution was adjusted to a pH of 9 with small amounts of additional boric acid and sodium hydroxide. The mixture was agitated until a stable dispersion of organic droplets had formed in the aqueous phase and then the mixture was heated to 70° C. for 8 hours. The resulting copolymer beads and reaction mixture was then split in half.

The first half of the batch was then immediately hydrolyzed with 327.4 g of 50% sodium hydroxide without first removing the porogen from the resin in a distillation step. The reaction mixture was heated to 93° C. and held for seven hours. During the hydrolysis a two-phase liquid mixture collected in the distillate trap. The liquid phases were separated using a separatory funnel and consisted of 74.0 g MIBK (corresponds to 82% recovery) and 14.7 g of an aqueous layer. The resulting beads were observed using an optical microscope and the beads were opaque and had a uniform appearance (no core-shell structure evident).

This mixture was then transferred to a Buchner funnel and the liquid drained. The drained liquid consisted of a single aqueous phase and no MIBK was recovered from the reaction mixture. The resin was then washed with water and returned to the reactor and distilled. During this distillation an additional 4.6 g of MIBK was recovered (corresponding to a total MIBK recovery of 87%).

The resin was then washed with water and converted to the hydrogen form using 10% sulfuric acid. The percent volume change (decrease) of the resin from the sodium form to the hydrogen form was 54%. The resulting moisture holding capacity (MHC) of this resin was 64.6% and the weight and volume capacities were 9.63 eq/L and 2.50 eq/L, respectively.

Example 8

High Temperature Hydrostrip

The second half of the batch from Example 7 was returned to the reactor and the caustic hydrolysis performed as in that example although at more elevated temperature. After initially reaching 93° C. the temperature was increased to drive the distillation of porogen concurrently with the hydrolysis. Over the seven hours of the experiment the maximum temperature achieved was 105° C. The distillate composition after the combined hydrolysis-distillation was 94.0 g MIBK (100% recovery) and 38.9 g aqueous. The beads were opaque and of uniform appearance as in Example 7. The mixture was then transferred to a Buchner funnel and the liquid drained. The drained liquid consisted of a single aqueous phase and no MIBK was recovered from the reaction mixture. The resin was then washed with water and returned to the reactor and distilled. During this distillation no additional MIBK was recovered.

The resin was washed and converted to the hydrogen form using 10% sulfuric acid. The percent volume change (decrease) of the resin from the sodium form to the hydrogen form was 54%. The resulting moisture holding capacity (MHC) of this resin was 64.7% and the weight and volume capacities were 9.88 eq/L and 2.56 eq/L, respectively.

Example 9

Low Temperature Hydrostrip

A mixture of 185.1 g methyl acrylate, 34.9 g divinylbenzene (63% active ingredient), 180.0 g MIBK, and 2.82 g benzoyl peroxide (78% active ingredient) was charged to a 2 L round bottom flask containing an aqueous solution of 1.1 g Pharmagel, 8.5 g Padmac A, and 594.0 g deionized water. The aqueous solution was adjusted to a pH of 9 with small amounts of boric acid and 50% sodium hydroxide. The mixture was agitated until a stable dispersion of organic droplets had formed in the aqueous phase and then the mixture was heated to 70° C. for 8 hours. The resulting copolymer beads and reaction mixture was then split in half.

The first half of the batch was then immediately hydrolyzed with 327.4 g of 50% sodium hydroxide without first removing the porogen from the resin in a distillation step. The reaction mixture was heated to 93° C. and held for seven hours. During the hydrolysis a two-phase liquid mixture collected in the distillate trap. The liquid phases were separated using a separatory funnel and consisted of 86.9 g MIBK (corresponds to 97% recovery) and 18.3 g of an aqueous layer. The resulting beads were observed using an optical microscope and the beads were opaque and had a uniform appearance.

This mixture was then transferred to a Buchner funnel and the liquid drained. The drained liquid consisted of a single aqueous phase and no MIBK was recovered from the reaction mixture. The resin was then washed with water and returned to the reactor and distilled. During this distillation an additional 4.1 g of MIBK was recovered (corresponding to a total MIBK recovery of 100%).

The resin was then washed with water and converted to the hydrogen form using 10% sulfuric acid. The percent volume change (decrease) of the resin from the sodium form to the hydrogen form was 61%. The resulting moisture holding capacity (MHC) of this resin was 68.6% and the weight and volume capacities were 10.78 eq/L and 1.95 eq/L, respectively.

Example 10

High Temperature Hydrostrip

The second half of the batch from Example 9 was returned to the reactor and the caustic hydrolysis performed as in that example although at more elevated temperature. After initially reaching 93° C. the temperature was increased to drive the distillation of porogen concurrently with the hydrolysis. Over the seven hours of the experiment the maximum temperature achieved was 105° C. The distillate composition after the combined hydrolysis-distillation was 80.5 g MIBK (89% recovery) and 126.0 g aqueous. The beads were opaque and of uniform appearance as in Example 9. The mixture was then transferred to a Buchner funnel and the liquid drained. The drained liquid consisted of a single aqueous phase and no MIBK was recovered from the reaction mixture. The resin was then washed with water and returned to the reactor and distilled. During this distillation no additional MIBK was recovered.

The resin was washed and converted to the hydrogen form using 10% sulfuric acid. The percent volume change (decrease) of the resin from the sodium form to the hydrogen form was 61%. The resulting moisture holding capacity (MHC) of this resin was 69.2% and the weight and volume capacities were 10.98 eq/L and 1.82 eq/L, respectively.

Example 11

Standard Procedure without Washing

A mixture of 178.1 g methyl acrylate, 41.9 g divinylbenzene (63% active ingredient), 180.0 g methyl isobutyl carbinol (MIBC), and 2.82 g benzoyl peroxide (78% active ingredient) was charged to a 2 L round bottom flask containing an aqueous solution of 0.60 g methyl hydroxyethyl cellulose, 3.60 g boric acid, 1.8 g of 50% sodium hydroxide, and 594.0 g deionized water. The aqueous solution was adjusted to a pH of 9 with small amounts of additional boric acid and sodium hydroxide. The mixture was agitated until a stable dispersion of organic droplets had formed in the aqueous phase and then the mixture was heated to 70° C. for 8 hours.

The resulting copolymer beads and reaction mixture was then split in half. The first half was distilled at temperatures ranging from 90-100° C. to remove the MIBC porogen from the beads. The distillation was performed until no further MIBC was recovered in the distillate receiver. The resulting MIBC recovery was 95%.

The caustic hydrolysis was then performed by adjusting the water content in the reactor to 491 g and adding 327.4 g of 50% sodium hydroxide. The resulting mixture was then mixed and heated to 93° C. for seven hours during which time the resin beads were hydrolyzed to the sodium salt form of the carboxylic acid. The resin was then washed with water and converted to the hydrogen form using 10% sulfuric acid. The percent volume change (decrease) of the resin from the sodium form to the hydrogen form was 43%. The resulting moisture holding capacity (MHC) of this resin was 71.4% and the weight and volume capacities were 8.74 eq/L and 1.70 eq/L, respectively.

Example 12

Low Temperature Hydrostrip

The second half of the batch from Example 11 was hydrolyzed with 327.4 g of 50% sodium hydroxide without first removing the porogen from the resin in a distillation step. The reaction mixture was heated to 93° C. and held for seven hours. During the hydrolysis no liquid was recovered in the distillate receiver. The resulting beads were observed using an optical microscope and no core-shell appearance was evident.

This mixture was then transferred to a Buchner funnel and the liquid drained. The drained liquid contained small droplets of MIBC dispersed throughout the aqueous phase and could not be separated and quantified. The resin was then washed with water and returned to the reactor and distilled until no additional MIBC was observed to collect in the distillate receiver. During this distillation 25.6 g of MIBC was recovered (corresponding to a total MIBC recovery of 29%). By difference, the remaining 71% of the MIBC was driven from the beads during the hydrolysis.

The resin was then washed with water and converted to the hydrogen form using 10% sulfuric acid. The percent volume change (decrease) of the resin from the sodium form to the hydrogen form was 42%. The resulting moisture holding capacity (MHC) of this resin was 71.5% and the weight and volume capacities were 8.68 eq/L and 1.73 eq/L, respectively.

Example 13

Standard Procedure without Washing

A mixture of 178.1 g methyl acrylate, 41.9 g divinylbenzene (63% active ingredient), 180.0 g diisobutyl ketone (DIBK), and 2.82 g benzoyl peroxide (78% active ingredient) was charged to a 2 L round bottom flask containing an aqueous solution of 0.60 g methyl hydroxyethyl cellulose, 3.60 g boric acid, 1.8 g of 50% sodium hydroxide, and 594.0 g deionized water. The aqueous solution was adjusted to a pH of 9 with small amounts of additional boric acid and sodium hydroxide. The mixture was agitated until a stable dispersion of organic droplets had formed in the aqueous phase and then the mixture was heated to 70° C. for 8 hours.

The resulting copolymer beads and reaction mixture was then split in half. The first half was distilled at temperatures ranging from 90-100° C. to remove the DIBK porogen from the beads. The distillation was performed until no further DIBK was recovered in the distillate receiver. The resulting DIBK recovery was 92%.

The caustic hydrolysis was then performed by adjusting the water content in the reactor to 491 g and adding 327.4 g of 50% sodium hydroxide. The resulting mixture was then mixed and heated to 93° C. for seven hours during which time the resin beads were hydrolyzed to the sodium salt form of the carboxylic acid. The resin was then washed with water and converted to the hydrogen form using 10% sulfuric acid. The percent volume change (decrease) of the resin from the sodium form to the hydrogen form was 47%. The resulting moisture holding capacity (MHC) of this resin was 69.7% and the weight and volume capacities were 9.76 eq/L and 2.17 eq/L, respectively.

Example 14

Low Temperature Hydrostrip

The second half of the batch from Example 13 was hydrolyzed with 327.4 g of 50% sodium hydroxide without first removing the porogen from the resin in a distillation step. The reaction mixture was heated to 93° C. and held for seven hours. During the hydrolysis no liquid was recovered in the distillate receiver. The resulting beads were observed using an optical microscope and a core-shell appearance was evident. This core was observed to decrease in diameter with time during the hydrolysis but a significant core remained unhydrolyzed at the end of the seven hour hold.

This mixture was then transferred to a Buchner funnel and the liquid drained. The drained liquid contained 41.3 g DIBK. The resin was then washed with water and returned to the reactor and distilled until no additional DIBK was observed to collect in the distillate receiver. During this distillation 21.8 g of DIBK was recovered (corresponding to a total DIBK recovery of 24%). By difference, the remaining 76% of the DIBK was driven from the beads during the hydrolysis.

The resin was then washed with water and converted to the hydrogen form using 10% sulfuric acid. The percent volume change (decrease) of the resin from the sodium form to the hydrogen form was 47%. The resulting moisture holding capacity (MHC) of this resin was 69.4% and the weight and volume capacities were 9.29 eq/L and 2.04 eq/L, respectively.

MHC and Capacity Results

| Ex. | mon. | por. (45%) | DVB | disp | scheme | MHC | wt. cap. eq./kg | vol. cap. eq./L |
|---|---|---|---|---|---|---|---|---|
| 1 | MA | tol | 12% | MHEC | A | 57.9 | 9.78 | 2.94 |
| 2 | MA | tol | 12% | MHEC | B | 59.9 | 10.08 | 2.90 |
| 3 | MA | tol | 12% | MHEC | C | 60.1 | 5.14 | 1.51 |
| 4 | MA | tol | 12% | MHEC | D | 61.9 | 6.62 | 1.85 |
| 5 | MA | MIBK | 12% | MHEC | A | 64.3 | 9.36 | 2.46 |
| 6 | MA | MIBK | 12% | MHEC | B | 63.5 | 9.62 | 2.58 |
| 7 | MA | MIBK | 12% | MHEC | C | 64.6 | 9.63 | 2.50 |
| 8 | MA | MIBK | 12% | MHEC | D | 64.7 | 9.88 | 2.56 |
| 9 | MA | MIBK | 10% | note 1 | C | 68.6 | 10.78 | 1.95 |
| 10 | MA | MIBK | 10% | note 1 | D | 69.2 | 10.98 | 1.82 |
| 11 | MA | MIBC | 12 | MHEC | B | 71.4 | 8.74 | 1.70 |
| 12 | MA | MIBC | 12 | MHEC | C | 71.5 | 8.68 | 1.73 |
| 13 | MA | DIBK | 12 | MHEC | B | 69.7 | 9.76 | 2.17 |
| 14 | MA | DIBK | 12 | MHEC | C | 69.4 | 9.29 | 2.04 |

1. PADMAC/Pharmagel

Volume Change upon Acid Conversion Results

| Ex. | mon. | por. (45%) | DVB | disp | scheme | $V_i$ (mL) | $V_f$ (mL) | $\Delta V/V_i$ (%) |
|---|---|---|---|---|---|---|---|---|
| 1 | MA | tol | 12% | MHEC | A | 100 | 46 | 54 |
| 2 | MA | tol | 12% | MHEC | B | 100 | 45 | 55 |
| 3 | MA | tol | 12% | MHEC | C | 100 | 80 | 20 |
| 4 | MA | tol | 12% | MHEC | D | 100 | 68 | 32 |
| 5 | MA | MIBK | 12% | MHEC | A | 100 | 43 | 57 |
| 6 | MA | MIBK | 12% | MHEC | B | 100 | 46 | 54 |
| 7 | MA | MIBK | 12% | MHEC | C | 100 | 46 | 54 |
| 8 | MA | MIBK | 12% | MHEC | D | 100 | 46 | 54 |

-continued

Volume Change upon Acid Conversion Results

| Ex. | mon. | por. (45%) | DVB | disp | scheme | $V_i$ (mL) | $V_f$ (mL) | $\Delta V/V_i$ (%) |
|---|---|---|---|---|---|---|---|---|
| 9  | MA | MIBK | 10% | note 1 | C | 79  | 31 | 61 |
| 10 | MA | MIBK | 10% | note 1 | D | 79  | 31 | 61 |
| 11 | MA | MIBC | 12  | MHEC   | B | 100 | 57 | 43 |
| 12 | MA | MIBC | 12  | MHEC   | C | 100 | 58 | 42 |
| 13 | MA | DIBK | 12  | MHEC   | B | 100 | 53 | 47 |
| 14 | MA | DIBK | 12  | MHEC   | C | 100 | 54 | 46 |

1. PADMAC/Pharmagel

Structure of Core-Shell Resin Beads

Analysis by SEM—Core-shell beads made according to the method of this invention were analyzed with a scanning electron microscope to determine shell thickness and location of carboxylic acid functionality. Samples were cut in half with a razor and mounted on an aluminum stub with carbon tape, and given a light carbon coating. X-ray maps of the cross-sections were collected on a JEOL JSM-840 Scanning Electron Microscope equipped with a Princeton Gamma Tech Imix Energy Dispersive Spectrometer. The operating conditions of the microscope were as follows: accelerating voltage, 20 KeV; probe current, $6\times10^{-9}$ amp. The maps were collected for 1800 seconds at the 256 pixel setting in the PGT software.

Beads made according to Examples 3 and 4, with toluene as the porogen, were analyzed. Beads from Example 3 had a shell thickness of approximately 10 µm (0.0016 mm$^3$, 9.2% of total bead volume of 0.0173 mm$^3$). Of two sizes of beads analyzed from Example 4, a larger bead had a shell thickness of approximately 15-20 µm (0.0053 mm$^3$, 18.6% of total bead volume of 0.0283 mm$^3$); and two smaller beads with the same shell thickness had an average shell volume of 0.00117 mm$^3$, 24% of total average bead volume of 0.00485 mm$^3$. In each case, the sodium ions associated with the carboxylic acid groups appeared only in the shell volume.

Analysis by visual microscopy—Samples from hydrolysis were placed onto covered microscope plates with deionized water. The resin was observed with a Zeiss Stemi 2000C microscope. The magnification was varied until the growing shell could be seen clearly. Photos were obtained using a camera integrated into the microscope and printed with 200 µm calipers in the image to assist in determining shell and core thickness. Samples of beads made with MIBK as the porogen were hydrolyzed with MIBK still present in the beads, and examined visually at different hydrolysis times. The shell thickness as a function of time is shown in the following table. The average particle size of the beads increased from 181 µm to 306 µm during hydrolysis.

| hydrolysis time, minutes | shell thickness, µm | |
|---|---|---|
|  | Ex. 9 | Ex. 10 |
| 0   | 0   | 0   |
| 30  | 21  | 31  |
| 45  | 42  | 63  |
| 60  | 50  | 63  |
| 90  | 63  | 92  |
| 120 | 93  | 118 |
| 180 | 143 |     |

These results indicate that the shell thickness can be controlled according to the choice of porogen and the hydrolysis conditions.

The invention claimed is:

1. A macroporous core-shell resin bead having carboxylic acid groups; said bead comprising a core region surrounded by a shell region; said bead having from 3% to 100% of monomer residues derived from crosslinker, an average pore diameter of at least 1.5 nm, and an average particle size from 10 µm to 900 µm; wherein at least 90% of the carboxylic acid groups in the bead are in the shell region, and the shell region comprises from 5% to 75% of the bead by volume.

2. The bead of claim 1 in which the average particle size is from 100 µm to 500 µm, the shell region comprises from 5% to 50% of the bead by volume and the bead has from 5% to 30% of monomer residues derived from crosslinker.

3. The bead of claim 2 which is an acrylic resin.

4. The bead of claim 3 comprising from 8% to 30% of monomer residues derived from crosslinker.

5. The bead of claim 4 in which the shell region comprises from 10% to 30% of the bead by volume.

6. The bead of claim 5 in which at least 95% of the carboxylic acid groups in the bead are in the shell region.

7. The bead of claim 1 comprising from 80% to 100% of monomer residues derived from crosslinker.

* * * * *